United States Patent [19]

Joosten

[11] 4,219,810
[45] Aug. 26, 1980

[54] FREQUENCY DIVISION MULTIPLEX DIGITAL SEISMIC TELEMETRY SYSTEM

[75] Inventor: Wesley L. Joosten, El Paso, Tex.

[73] Assignee: Globe Universal Sciences, Inc., El Paso, Tex.

[21] Appl. No.: 905,945

[22] Filed: May 15, 1978

Related U.S. Application Data

[63] Continuation of Ser. No. 683,414, May 5, 1976, abandoned, which is a continuation of Ser. No. 507,063, Sep. 18, 1974, abandoned.

[51] Int. Cl.² ............................................. G01V 1/00
[52] U.S. Cl. .................................. 340/853; 340/861
[58] Field of Search ............... 340/15.5 CP, 15.5 MC, 340/15.5 TG, 15.5 TS, 5 T, 18 FM, 18 CM, 18 P, 147 T, 150, 179, 15.5, 18, 856, 861; 346/33 C; 73/DIG. 6; 181/103, 112; 179/15 BS

[56] References Cited

U.S. PATENT DOCUMENTS

| | | |
|---|---|---|
| Re. 23,919 | 1/1955 | Hawkins .................... 340/15.5 TS X |
| 3,134,957 | 5/1964 | Foote et al. .............. 340/15.5 TS X |
| 3,212,598 | 10/1965 | Anderson .................... 340/18 FM X |
| 3,748,638 | 7/1973 | Montgomery, Jr. et al. ...... 340/15.5 MC |
| 3,958,216 | 5/1976 | Chapman .................. 340/15.5 TS X |

Primary Examiner—Theodore M. Blum
Attorney, Agent, or Firm—Hubbard, Thurman, Turner, Tucker & Glaser

[57] ABSTRACT

A seismic telemetry system employing frequency division multiplexing techniques is disclosed. Analog seismic data are received by remote data acquisition units (RDAU's) converted to digital form and stored in the RDAU's. The data are transmitted via a transmission line to a central station for recording. The RDAU's are connected at randomly selectable locations along the transmission line. Either an RF command or digital strobe signal is used to interrogate the RDAU's from the central station. Each RDAU responds on a separate RF carrier frequency, modulated by the previously stored digital data. The data from each RDAU, therefore, need not be separated along the transmission line from the data received from other RDAU's. At a central station, the data signals are demultiplexed and recorded. Use of high-impedance transmitters and receivers permits the transmission line to operate in flat-line mode. Elimination of the previous requirements for data separation along the line permits significantly increased data rates to be handled.

5 Claims, 9 Drawing Figures

FREQUENCY DIVISION MULTIPLEX DIGITAL SEISMIC TELEMETRY SYSTEM

This is a continuation of Application Ser. No. 683,414, filed May 5, 1976, now abandoned which was a continuation of Ser. No. 507,063, now abandoned which was filed Sept. 18, 1974.

FIELD OF THE INVENTION

This invention relates to seismic telemetry systems.

BACKGROUND OF THE INVENTION

A seismic telemetry system employing a transmission line for data handling from remote units is disclosed in pending application Ser. No. 412,763, filed Nov. 5, 1973, by Wesley L. Joosten, et al, now abandoned and the application of Wesley L. Joosten, et al, Ser. No. 699,714 defined June 25, 1976, a continuation of the first-referenced application, itself now abandoned and the application of Wesley L. Joosten, Ser. No. 751,061 filed Dec. 6, 1976, a continuation of the second-referenced application.

The last-referenced application is assigned to the assignee of the present application. The disclosure of that application is hereby incorporated by reference, and for convenience the system therein disclosed will be referred to as the TDM (time division multiplex) cable system. As will be shown hereafter, the present invention permits a significant increase in date rate of the system. In the seismic business today, there is an ever-increasing demand for larger data rates. These larger rates are mandated by one or more of the following: Shorter sampling intervals; more accurate measurement of seismic signals (more bits per sampling); and more data acquisition points per shot. The present invention accomplishes those objectives, as will appear from the description to follow.

SUMMARY OF THE INVENTION

Analog seismic data are received by remote data acquisition units or stations (RDAU's) converted to digital form and stored in the RDAU's. The data are transmitted via a transmission line to a central station for recording. The RDAU's are connected at randomly selectable locations along the transmission line. Either an RF command on the cable or digital strobe signal on the cable is used to interrogate the RDAU's from the central station. Each RDAU responds on a separate RF carrier frequency, modulated by the previously stored digital data. The data on each RDAU, therefore, need not be separated on the transmission line from the data received from other RDAU's. At a central station, the data signals are demultiplexed and recorded. Use of high-impedance transmitters and receivers permits the transmission line to operate in flat-line mode.

DESCRIPTION OF THE PREFERRED EMBODIMENT

Figure 1:
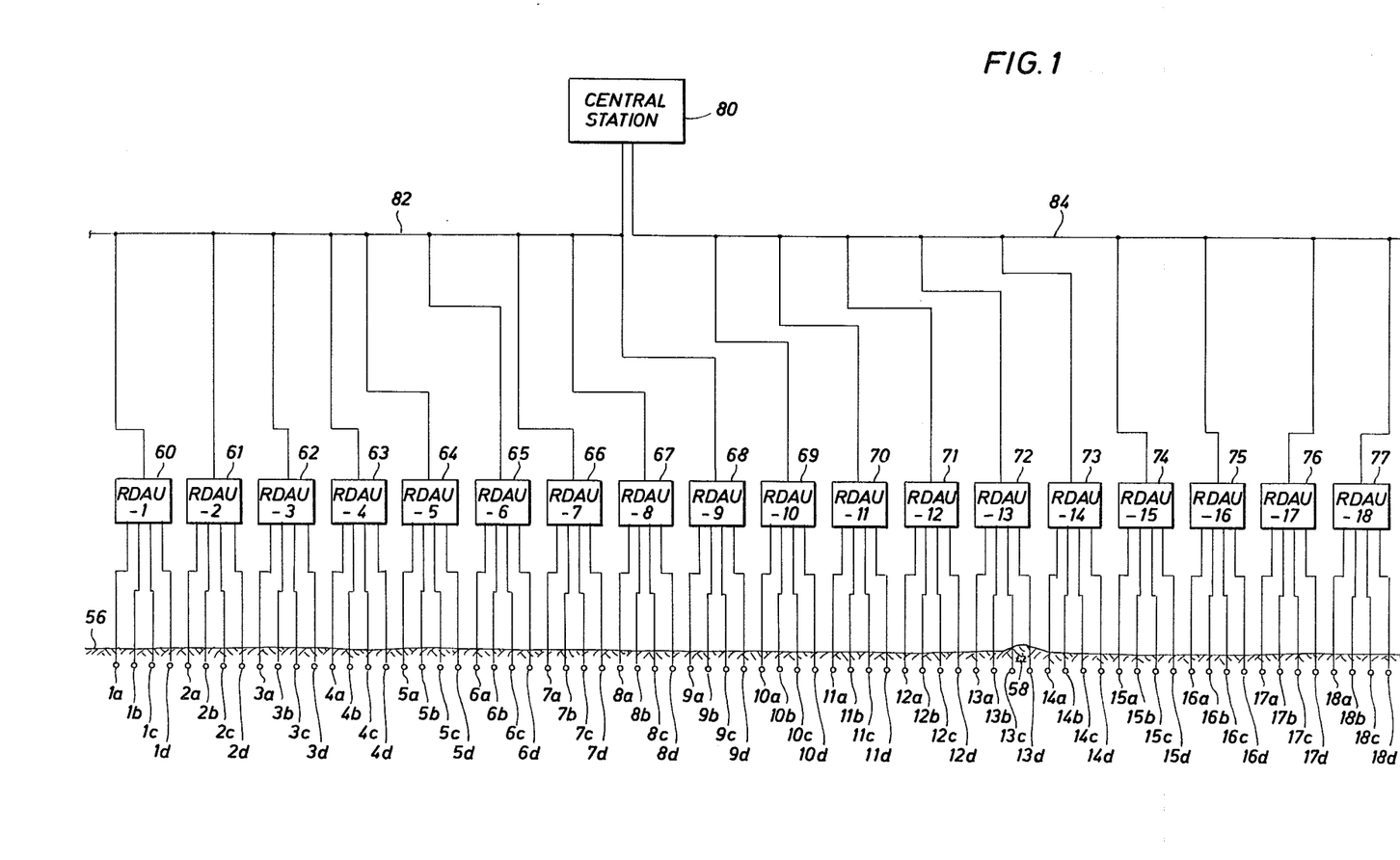
FIG. 1 is an illustration of the layout of the system of the present invention.
Figure 2:
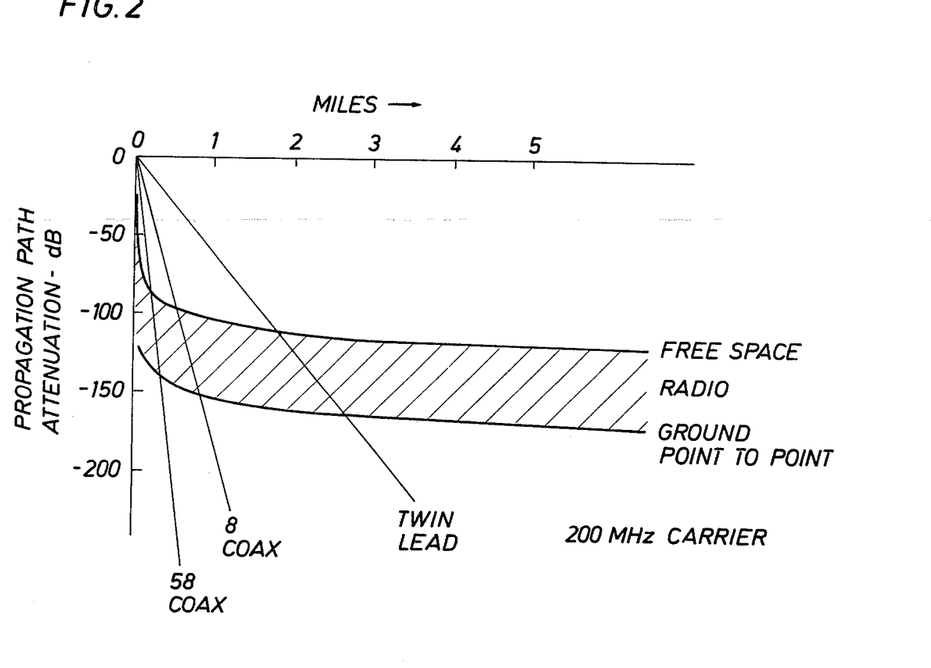
FIGS. 2 and 3 are diagrams illustrating signal losses for various types of propagation.

Now referring to the drawings and first to FIG. 1 thereof, an example of a typical seismic surveying system is illustrated. Geophones 1a–1d are spaced along the terrain 56 at regular intervals, insofar as possible. Each geophone may be an equivalent seismometer or an array, but will be referred to hereinafter as merely a geophone. The geophones are approximately in line with one another, insofar as terrain 56 will permit.

In performing seismic exploration a number of shot points are located in close proximity with at least a number of the geophone stations, perhaps each station. One such shot point location 58 is shown adjacent geophone 13c, 13d.

With respect to the surface of the earth, the geophones may be placed on the surface of the terrain, mounted above the terrain or placed in a hole drilled beneath the surface. Likewise, the shot points may be similarly positioned with respect to the earth surface in accordance with the preference of the seismic surveying crew.

Each sucessive four geophones are connected to a remote data acquisition unit (RDAU) station located in the field. For example, RDAU-1 station 60 is connected to geophones 1a, 1b, 1c and 1d; RDAU-2 station 61 is connected to geophones 2a, 2b, 2c and 2d, and, in like manner, RDAU-3 station 62 through RDAU-18 station 77 are respectively connected to four successive geophones.

Central record and control station 80 is connected to each of the RDAU stations 60–77 by either one or two transmission lines. If the central station is located near one end of the line (i.e., near RDAU-1 station 60 or RDAU-18 station 77), then only one common transmission line is necessary. In FIG. 1 central station 80 is located near RDAU-8 station 67; therefore, there are effectively two transmission lines connected to central station 80. Upstream transmission line 82 is common to RDAU-1 station 60 through RDAU-18 station 77. It should be understood that the term "single transmission line," as used herein, comprehends such upstream and downstream arrangements. A more complete description of this transmission line is set out below.

Even though geophones 1a–18d are spaced uniformly approximately at equal distances along the line, there is no requirement to connect each of the RDAU stations to transmission lines 82 and 84 at uniform spacings. Therefore, connections are made to these lines wherever it is physically convenient.

The TDM system disclosed in the above-mentioned copending application Ser. No. 412,763, involves the use of varying delays, or "time slots" for putting data from the successive RDAU's on the line. The number of bits which can be transmitted along the line in a sampling interval, e.g., one millisecond, is thereby limited. Thus, a single five-mile line without repeaters can handle 24-channel one-millisecond data, or 48-channel two-millisecond or 96-channel four millisecond data. To overcome these limitations is a principal object of the present invention.

The system of the present invention consists of a transmission line which acts as the propagation "medium" for the radio carrier frequencies. Each station, as shown in FIG. 1 of the drawings, is "coupled" to the "medium" in such a manner that the radio signals are propagated in both directions from the source.

The seismic analog data are acquired and conditioned, prior to being digitized, in the remote data acquisition units, as previously stated. The transmitting of this digital information to the recording van via a transmission cable is accomplished by the telemetry system of the present invention. The recording van controls the system in all aspects and records the data resulting from this controlled system. The system operates as a frequency division multiplex (FDM) system because a different portion of the spectrum for the telemetered data from each remote data gathering box is used for feeding the telemetry signals simultaneously from each box to a single cable.

Figure 3:
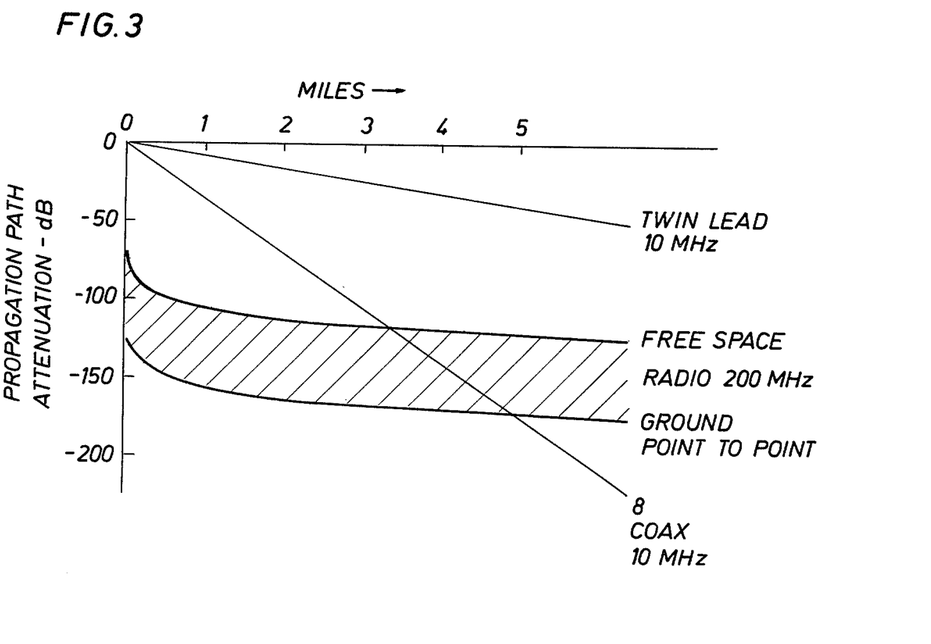

"Radio" spectrum availability is of course not a factor here, and accordingly the carrier frequencies for the cable system can be selected for other reasons. FIG. 3 of the drawings compares cables operating at 10 megahertz to radio at 200 megahertz. One cable, the twin lead, is preferred over others in that the propagation loss at a distance of five miles is 42 db at 10 megahertz. Where a 4-watt (typical) radio signal would be required to ensure reception of the telemetry signal from the remote data units, a one-milliwatt signal suffices for the cable. The four-thousand-to-one power reduction translates into more system reliability due to simpler instruments and less instrumentation investment.

A suitable twin-lead cable for use in the present system is the type commonly used for television antennas. These twin leads normally carry two parallel copper conductors, each about 0.07–0.08 inches in diameter, separated by about 0.4–0.5 inches, and covered in insulated polyethylene.

The twin-lead type cable is a balanced transmission line which does not require special connectors. The balanced operation provides significant isolation from noise induced on the line from external sources. The line is operated in "flat line" mode, that is with a VSWR of unity (ideal). This prevents reflections on the line from creating echoes, which are the equivalent of multi-path signals in radio telemetry. The single long line serves to send commands to the remote units from the control station 80 and to bring back data to the control station from the remote units connected to the line at intervals determined by the seismic application. It is possible to use a coax cable in the same mode, except the attenuation is much more severe and connector systems must be considered at each remote unit's position along the line.

The line, to remain "flat," is terminated at the control station and at the furthest end by a resistor equal to the characteristic impedance. The control station termination consists of two resistors, one from each side of the line to earth ground. This will bleed electrostatic charges from the line to earth so that the voltage can not become high enough to produce equipment damage.

A frequency division multiplexed system may use one carrier frequency per remote unit, and one carrier for control. A different portion of the available spectrum (frequency slot or band) is allocated to each carrier. Were it not for the dispersive nature of propagation media, whereby the higher frequencies are always attenuated more than the lower frequencies, the complete frequency spectrum would be available for cable telemetering.

A five-mile cable will cause an attenuation of 42 decibels at 10 megahertz, 55 decibels at 15 megahertz, 67 decibels at 20 megahertz, 79 decibels at 25 megahertz, and 91 decibels at 30 megahertz. At the control station, the worst case difference in carrier signal level will occur for the highest frequency carrier at a distance of 5 miles and the lowest frequency carrier close to the station. This difference in signal level would be 27 db for 20 megahertz, for example.

Additionally, harmonics of the lower carrier frequencies cause interference with higher frequency channels. Restricting the spectrum to a frequency octave immunizes the system to this harmonic interference. The octave band selected is the lowest band that provides sufficient system information capacity for the multiple carriers, which is in turn determined by the characteristics of the demultiplexing filters.

Figure 4:
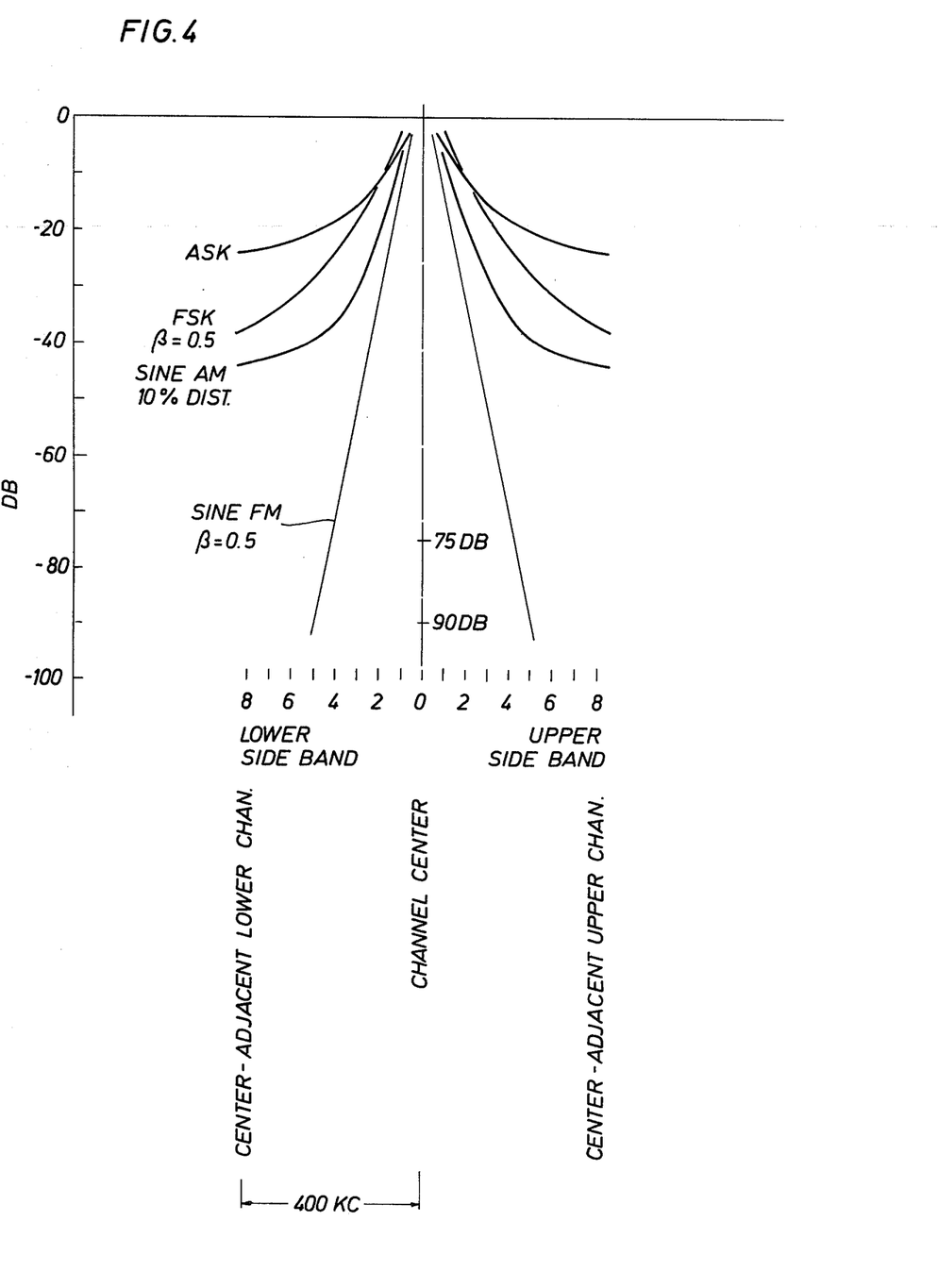
FIG. 4 is a diagram illustrating the channel-spacing advantages of sine-wave FM over other types of modulation.

With respect to spectra of FDM signals, sine-wave FM is the preferred technique. The base-band filtered digital signal is used to linearly frequency-modulate the carrier. The amplitude of the side bands is given by $SB = J_N(B)$, where B is the modulating index. This Bessel function can be represented by a mathematical series that is rapidly convergent for B less than unity. The envelope amplitude tends to disappear asymptotically, meaning that the spectrum envelope is inherently self-bounding without the use of filters. Unlike linear AM, distortions in the modulating signal or frequency modulation process (as high as 10%) produce insignificant variations in the spectrum envelope. FIG. 4 of the drawings shows the advantage of sine wave FM over other types of modulation, including amplitude shift key (ASK), phase shift key (PSK), and frequency shift key (FSK).

Equipment for carrying out the foregoing functions will be described with reference to FIGS. 1 and 5–9 of the drawings. Referring again to FIG. 1, at each RDAU station 60–77 there is a remote data acquisition unit comprising a receiver, a crystal-controlled timer or clock, a transmitter and data acquisition and storage means. The data acquired and stored at each of the RDAU stations is sent back to control station 80 along the transmission line to which it is connected following a scan or strobe signal sent out from the control station along the transmission line. A single strobe from the control station interrogates and actuates each of the RDAU stations in turn. These RDAU stations may be considered to be randomly disposed along their respective transmission lines. As above described, the actual positioning is dependent on physical conveniences not related to data acquisitions.

At control station 80 there are two receivers, one for receiving signals from the upstream stations and one for receiving the signals from the downstream stations. Assuming that initial setup and addressing have been established to initiate interrogation or operation of the RDAU stations, a scan or strobe burst is inserted at control station 80 on both the upstream and downstream transmission lines 82 and 84. The strobe burst propagates along a transmission line. As it reaches each station, a sequence of events occurs, which will be described with reference to FIGS. 7–10 of the drawings.

Figure 5:
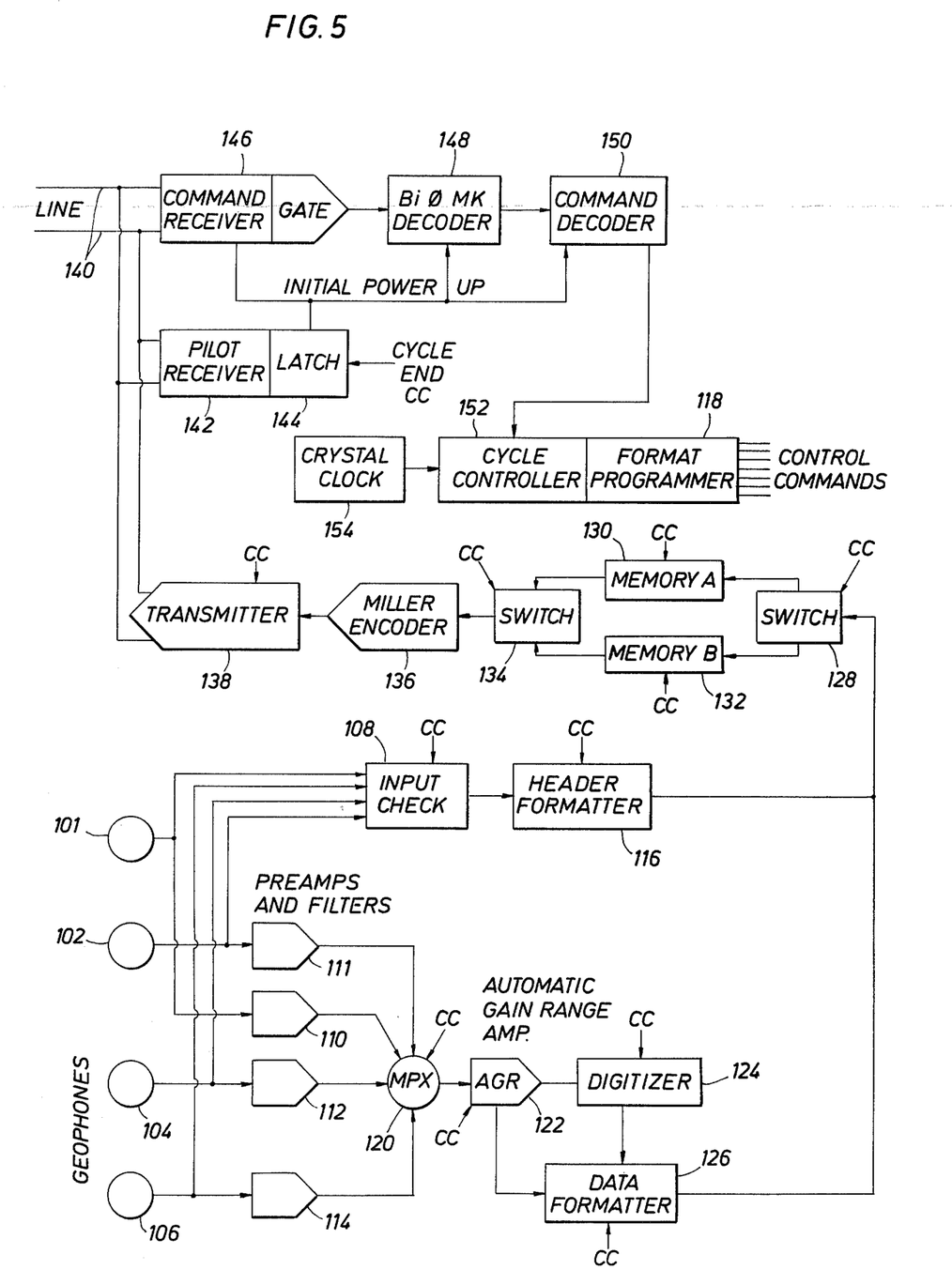
FIG. 5 is a block diagram of a typical RDAU station.

Referring now to FIG. 5, a block diagram of a typical RDAU station is shown. Individual channel geophones or seismic sensors 101, 102, 104 and 106 are applied to input check unit 108 and also respectively to appropriate preamplifiers and filters 110, 111, 112 and 114. Input check unit 108 is connected to header formatter unit 116 and both units 108 and 116 are connected to receive control commands (CC) from format programmer 118 for a purpose to be hereafter explained.

The channel preamplifiers and filters are connected to time multiplexer 120, whose output is connected to automatic gain range amplifier 122, which, in turn, is connected to both digitizer 124 and data formatter 126. Units 120, 122, 124, and 126 are all connected to receive control commands (CC) from format programmer 118. The seismic signals pass from the time multiplexer and undergo treatment in the gain range amplifier, digitizer and data formatter in a manner well known in the art. Typically, gain information will be in the first four bit cells and the mantissa will be in the next 15 bit cells.

Input check unit 108 and header formatter unit 116, upon control command, monitor the input from the four channel geophones and determine an overall gain code in appropriate format to be associated with the data. Switch 128 receives the header code and the data blocks and alternately allows the data to be stored in memory A 130 or memory B 132. Output switch 134 connected to both memory units permits alternate call up of the information stored in the memory units. Note that units 128, 130, 132 and 134 are all connected to receive control commands from format programmer 118.

The output from switch 134 is applied to Miller encoder 136 and the encoder is connected to transmitter 138, the output of which is connected to transmission line 140.

The illustrated RDAU station is activated by the presence of an enabling signal present on the line which is detected by low power pilot receiver 142, which activates latch 144 for turning on command receiver 146. At the end of the transmission cycle, latch 144 is operated by a control command to turn off the data receiver. Latch 144 also causes power to be applied to bi-phase-mark decoder 148 and command decoder 150.

It may be recalled that the strobe burst is coded in bi-phase-mark code and therefore bi-phase-mark decoder 148 allows command receiver 146 to be sensitive to such a strobe burst for triggering, via the command decoder 150 and cycle controller 152. Cycle controller 152 also receives an input from crystal clock 154. Upon command from decoder 150, it synchronizes the operation of the station by selecting the next appropriate cyclical output from clock 154 and, in accordance with a fixed time delay, produces via format programmer 118 the control commands at the station.

Cycle controller 152 is programmed with the proper address as described above by receipt of the strobe burst and the accompanying time delay. Thereafter, each time a strobe burst is sensed, the timing automatically operates to put the data from the station onto the line after the design delay time, as above discussed.

Figure 6:
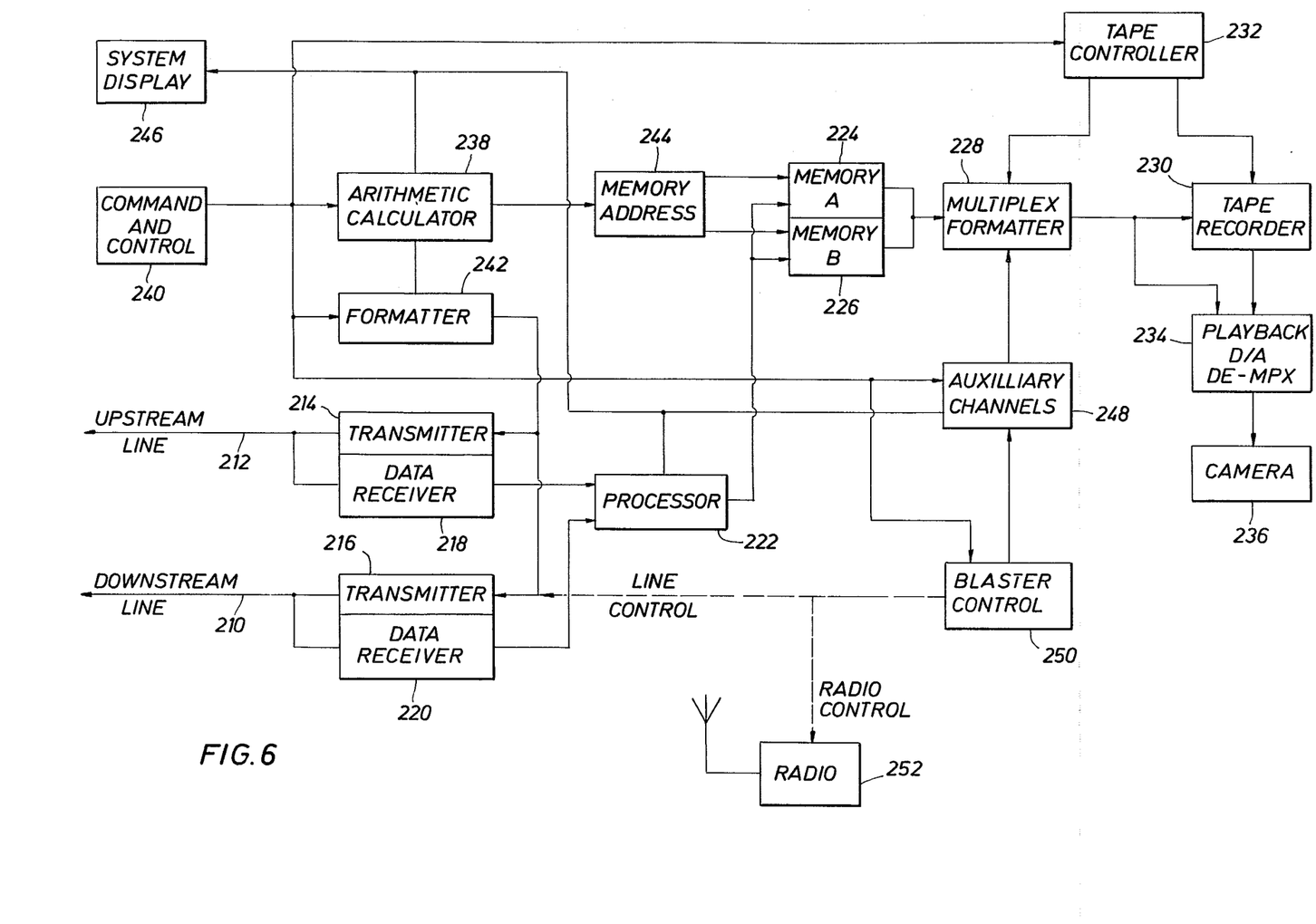
FIG. 6 is a block diagram of a control and recording station.

Now referring to FIG. 6 of the drawings, a block diagram of the central or control and recording station is illustrated. In this diagram, it is assumed that the control station is connected to downstream line 210 and to upstream line 212. Hence, there are two transmitters, 214 and 216, respectively, and two data receivers, 218 and 220, respectively. The data receivers are connected to processor 222, which, in turn, is connected alternatively to memory A 224 and to memory B 226.

Memory units A and B are connected to multiplex formatter 228, which, in turn, is connected to a multiple track tape recorder 230. Both the multiplex formatter and the tape recorder are controlled by tape controller 232.

So that the information recorded on the tape recorder may be played back, tape recorder 230 is connected to playback unit 234, comprising a digital-to-analog converter and demultiplexing unit. Playback unit 234 is then connected to camera 236. So that information data can be taken directly from the multiplex formatter, rather than from the tape recorder, a direct connection is made from multiplex formatter 228 to playback unit 234.

The functional heart of the central or control station is arithmetic calculator 238, which functions as an electronic bookkeeper for the station operator. Calculator 238 is connected to command and control unit 240, by which the operator identifies the RDAU station by the number at which the control station is located, the number of the RDAU station closest to the station on the upstream line, and whether the RDAU numbers are in ascending or descending sequence (determined by whether the line is moving north or south, for example). Similarly, the operator may identify the number of the RDAU station closest to the station on the downstream line and whether the RDAU numbers are in ascending or descending sequence.

The arithmetic calculator determines which RDAU stations are called up and assigns the proper carrier frequency to each upstream and downstream group via formatter 242, which is connected to each of transmitters 214 and 216. Note also that the arithmetic calculator is connected to memory address unit 244, which in turn is connected to memory units 224 and 226.

When rolling one RDAU position, arithmetic calculator 238 automatically advances the number assignment and carrier frequency assignment on command by the operator, or redetermines the RDAU station positioning by the operator reidentifying his beginning RDAU station and upstream closest RDAU station. The system positioning and frequency assignments are displayed on system display unit 246 connected to calculator 238 so that the operator has a continual visual description of the deployment of his system.

Arithmetic calculator 238 also furnishes information about the system positioning and frequency allocations to memory address unit 244, which uses this information to place each returning data burst in the proper place in a random access memory, either memory A or memory B, thus performing the "remapping" function. While the data are being stored in memory A, the previous data is read out of the memory B, remultiplexed from a 54 to a 48 channel system and recorded on tape. Note that command and control unit 240 is connected to auxiliary channels unit 248. This connection determines which of the six active channels are not used at a particular time. Note also that auxiliary channels unit 248 is connected to system display 246 to provide a complete visual presentation of the system, including those which are found included in the multiplex recording at any one time.

Blaster control unit 250 is connected to command and control unit 240 so that impulses may be sent by radio 252 to trigger the source shots. Alternatively, the blaster control signals may be sent via a transmitter along suitable transmission lines, the blaster control signal being time-shared coordinated with the strobe signals sent from the control station in the manner previously described. Perhaps different lines are used to trigger the shots. If not, the blaster control signals would be coded so as to actuate the shots, but so as not to actuate the RDAU stations until the proper delay and the subsequent transmission of the strobe burst is transmitted for that purpose.

Figure 7:
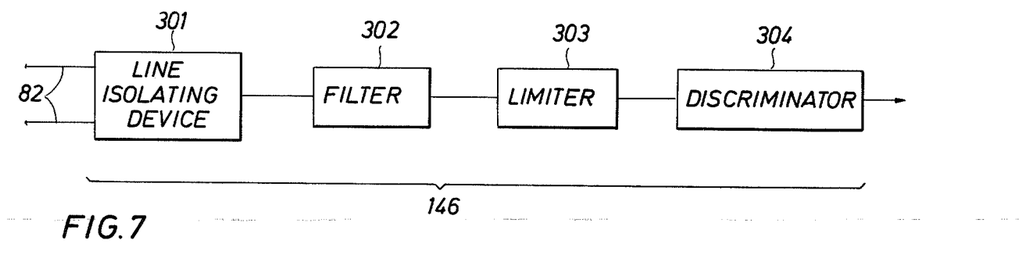
FIG. 7 is a more detailed diagram of the RDAU command receiver 146 of FIG. 5.

More details of the RDAU command receiver 146 (FIG. 5) are shown in FIG. 7 of the drawings. The receiver is seen to be comprised of a line-isolating device 301, a filter 302, a limiter 303, and a discriminator 304.

The line isolating device 301 is an amplifier which is broad band so that it can pass all RF signals on the line. It has a high, balanced, input impedance typically 100 times the line impedance, so that line loading is reduced to an insignificant level. The device amplifies the control signal on the line and changes the signal to an unbalanced, low impedance output suitable for driving the filter.

The filter (302) selects the same RF channel for all RDAU's (the command channel). This filter is a narrow band crystal filter which has extremely sharp skirts. (The shape factor of a filter describes the ratio of bandwidth of the filter at an attenuation of 6 dB down from its passband. This filter has a S.F. of typically 2.) The filter also has very large adjacent channel attenuation, typically 100 dB, so that extreme selectivity of the desired RF channel is obtained to the exclusion of all other RF signals.

The signals in the desired RF channel, having been selected by the filter are then amplified and clipped in the limiter, so that the output of the limiter is a constant amplitude signal, whose frequency varies according to the frequency modulation of the originating transmitter.

The limited signal then drives a suitable discriminator which converts the frequency modulation back to the analog signal which produced the modulation in the beginning.

Figure 8:
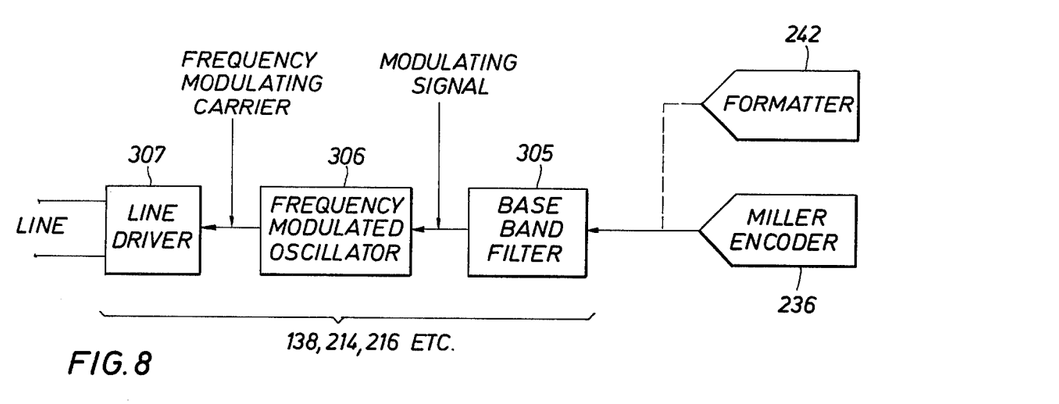
FIG. 8 is a more detailed diagram of the data transmitters 138 of FIG. 5 and 214, 216 of FIG. 6.

Further details of transmitters 138, 214 and 216 are shown in FIG. 8 of the drawings. Conventionally formatted data from the Miller encoder 136 are base-band filtered in filter 305, modulated and passed through FM oscillator 306. The oscillator output is an FM modulated carrier which is applied to the line driver 307.

The digital signal produced by the digital logic is characterized by two states (on or off, "1" or "0", high voltage or low voltage). The transition from one state to the other state is quite rapid so that the transition can be considered essentially as instantaneous. These transitions take place in time according to the scheme of data encoding. It can be seen that these instantaneous voltage transitions produce large numbers of higher order harmonics.

The base band filter removes all harmonics from the encoded wave form which are higher than the highest bit frequency. The resultant spectrum is thus band limited to that portion only necessary to transmit the intelligence contained in the digital data. This resulting base band filtered digital data is characterized by a highest sinusoidal frequency corresponding to the highest bit frequency, and is used to frequency modulate an oscillator to produce a frequency modulated RF signal.

This spectrum limiting (or spectrum bounding) of the digital data signal by the base band filter allows a precise determination to be made of the frequency components present in the frequency modulated RF signal. This precise determination is mandatory in order that the RF spectrum utilization efficiency be maximized for maximum data rate while keeping adjacent channel interference down to a tolerable level. The frequency modulated signal is then amplified in the line driver.

Line driver 307 operates with mismatched coupling, which, while not efficient in an engineering sense, offers a practical method of connection to the transmission line. Mismatched coupling to the transmission line is equivalent to connecting a large impedance R between the generator (line driver) and the line. The use of FDM implies that the driver must be broad-banded, in order to operate with all the possible transmitted frequencies, and must impress a relatively constant voltage on the line at all frequencies. These requirements are met when R is a resistance rather than a frequency-dependent reactance.

A push-pull current source driver with high impedance tuned outputs satisfies the driver needs. An FM signal is transferred to the load ($\frac{1}{2}$ Z) by the current source drivers so that the carrier signal is added to the other FM signals present on the line from other data acquisition boxes.

The impedance connected across, or loading, the transmission line is $Z_1 = 2Z'$, where $Z'$ is the parallel equivalent of the tuned circuit impedance and the current generator output impedance. $Z_1$ is typically 30 K, representing insignificant loading of the transmission line.

This type of driver allows the connection of large numbers of boxes to the transmission line at any interval (regular or irregular) as dictated by the requirements of the seismic system.

Figure 9:
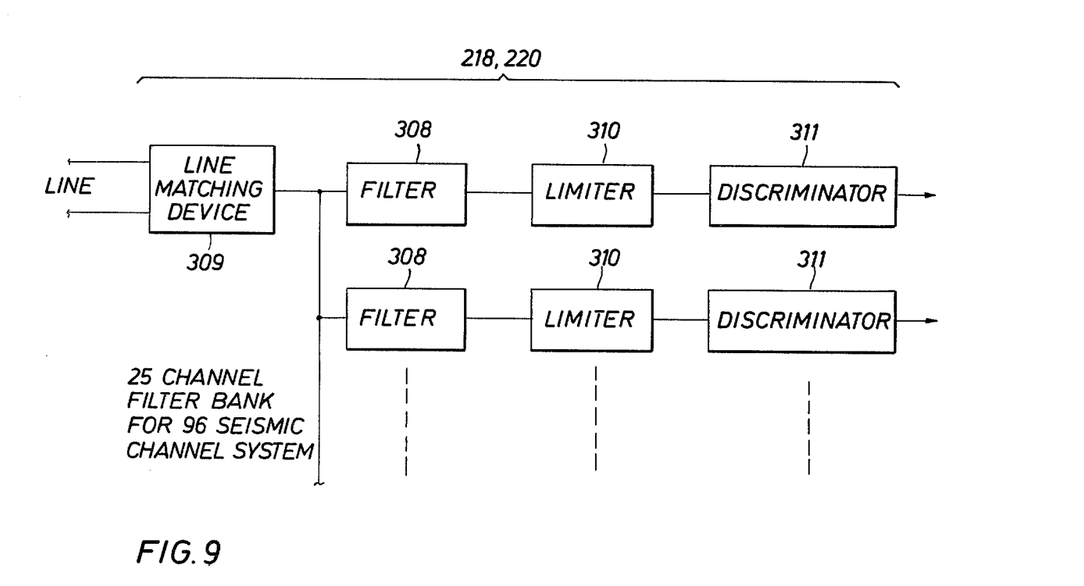
FIG. 9 is a block diagram of the demultiplexing receiver of a control station 218, 220 of FIG. 6.

FIG. 9 illustrates the technique by which the control station receiver separates the FM carriers from each other by the use of frequency selective filters. The filters must attenuate signals from adjacent channels to produce the required channel isolation. The bank of demultiplexing frequency filters 308 in the control station is preceded by a broadband transmission line impedance matching device 309, such as a transformer or buffer amplifier. This matching device also serves to convert the balanced line signal to an unbalanced signal. The matching device 309 drives a bank of filters 308 which separates the carriers from the remote data boxes into the proper channels. It is more advantageous to use passive matching devices, because active devices are the source of intermodulation signals which create interference. Following each filter is a signal limiter 310 which amplifies and hard-limits the signal, irrespective of its input amplitude. A conventional or other type FM discriminator 311 demodulates the amplitude limited FM signal and recovers the digital data.

It is now in order to discuss channel spacing and data rates. A bit cell is defined as the time required to send one bit of digital information. Baseband filtering the digital signal results in a maximum sinewave frequency equal to 2 bit cells for digital codes such as "delay modulation" and "NRZ." In Manchester codes such as "biphase mark," the maximum frequency is the equivalent bit cell frequency. A seismic digital system sampling at 1 millisecond intervals produces about 25 kilobits per second (KBPS) per channel.

A pass-band filter is specified by the shape factor (SF) and ultimate attenuation (UA). The shape factor is the ratio of the bandwidth at 60 db attenuation to the bandwidth at 6 db attenuation. The shape factor for an ideal (rectangular) filter is 1. The ultimate attenuation is that minimum attenuation at any frequency outside the filter passband. By assigning a signal-to-noise ratio of 20 db, the worst case difference in signal level of 70 db requires that the filter have at least 90 db attenuation at frequencies on either side of the carrier center equal to the channel spacing. This requirement emerges from a study of the self-bounding nature of the frequency modulated signal. A sine-wave modulated FM signal with a modulation index of 0.5 requires a passband width somewhat in excess of two times the data frequency.

For a system using one remote data gathering unit for each four seismic channels, the data rate for a one millisecond sampling system would be 50 KBPS, requiring a modulated carrier passband width of about 120 kilohertz for a 0.5 modulation index.

For a 96 channel system, 27 carrier channels (24+1 gap, 1 roll, and 1 control) are required. For an upper carrier of about 21 megahertz, the channel spacing becomes 400 kilohertz. A filter with a shape factor of 3.4 is required, and a UA of 75 db.

A 4 channel system using a modulation index of 0.7 would need a filter with a shape factor of about 3.

A system with an upper carrier of 15 megahertz would have a channel spacing of 300 kilohertz, with a filter shape factor of 3.1, and a UA of 75 db. A many pole LC filter would be required to meet the channel insulation requirements. The use of crystal filters is preferred.

A 24 carrier, 96 channel, 1 millisecond system with a modulation index of 1 would require higher carrier frequencies (more channel separation), filters with wider passbands, and filter shape factors of about 1.5. The smaller shape factor would be required to compensate for the increased interferences produced by the larger differences in the carrier amplitudes.

The differential attenuation between a far-out (on the line) high frequency carrier and a close-in low frequency carrier produces a large (worst case) signal level difference between two adjacent channels that must be dealt with by the channel separating filters. By sensing and comparing a reference signal received in the control channel, a measure of the attenuation of the signal is derived. This knowledge of the attenuation could then be used to control the amplitude of the modulated carrier inserted on the line so that the greater the distance to the control station (greater attenuation), the larger the transmitted signal. In this manner the worst case signal level difference at the control station can be held to no more than 40 db. For a signal-to-noise ratio of 20 db, the filter must furnish only perhaps 60 db of channel separation.

What is claimed is:

1. A seismic data telemetry system for coupling signals from a plurality of geophones on the earth's surface to a central recording station comprising:
   a single two-wire transmission line having first and second ends,
   a termination resistor having a resistance substantially equal to the transmission line characteristic impedance connected across the first end of said transmission line,
   a plurality of remote data acquisition units each having: at least one geophone input adapted for connection to a geophone; a local oscillator having an input coupled to said geophone input and an output for providing a modulated radio frequency carrier wave signal, wherein the carrier wave radio frequency of each local oscillator is a preselected unique frequency and the modulation carries the signal received at said geophone input; line driving means having an input connected to said local oscillator output and a high impedance output connected to said transmission line at a randomly selected position between said first and second ends,
   data receiving means having an input connected to said second end of said transmission line, said data receiving means having an input impedance substantially equal to the transmission line characteristic impedance, and including means for separating signals from the remote data acquisition units according to carrier wave frequency, for demodulating each separated signal, and for providing outputs to a recording station.

2. A seismic data telemetry system according to claim 1 further including:
   interrogation means connected to said second end of said transmission line for inserting an interrogating signal on said transmission line;
   receiver means at each remote data acquisition unit for detecting said interrogating signal; and
   sampling and digitizing means connected to said geophone input, said local oscillator input, and said receiver means for, in response to detection of an interrogating signal, sampling the signal at said geophone input, digitizing said sampled signal and coupling said digitized sampled signal to said local oscillator input.

3. A seismic data telemetry system according to claim 2 wherein said remote data acquisition unit has two or more geophone inputs, further including multiplexing means for sequentially coupling said inputs to said sampling and digitizing means.

4. A seismic data telemetry system according to claim 1 wherein said radio frequency carrier wave signal is frequency modulated by said signal received at said geophone input.

5. A seismic data telemetry system according to claim 1 wherein said two-wire transmission line comprises two parallel copper conductors each about 0.07 to 0.08 inches in diameter, spaced apart about 0.4 to 0.5 inches by an insulating plastic material.

* * * * *